No. 709,878. Patented Sept. 30, 1902.
F. H. DANIELS & H. W. WYMAN.
MANUFACTURE OF RAIL BONDS.
(Application filed Feb. 7, 1902.)
(No Model.)
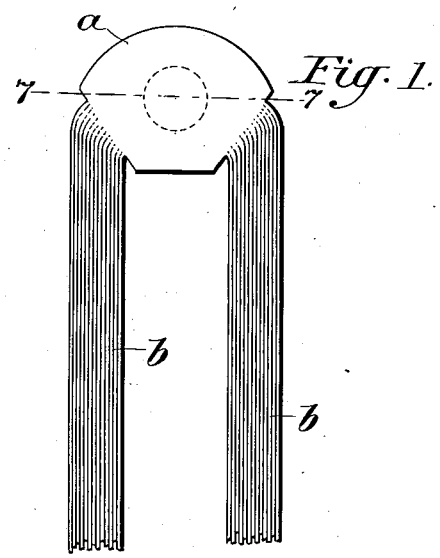
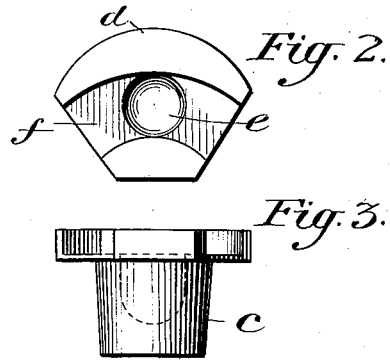
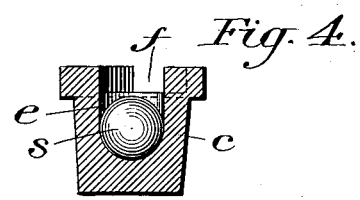
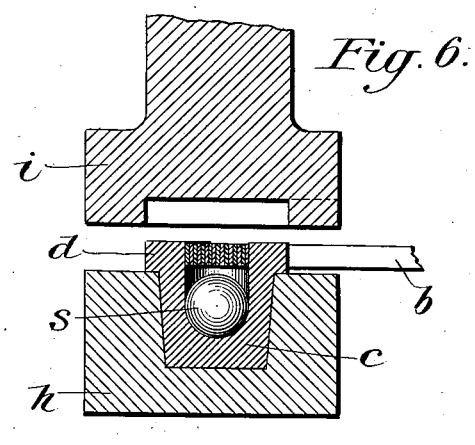
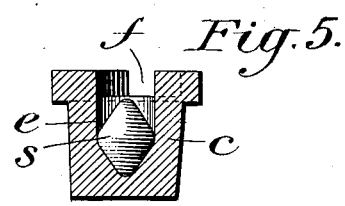
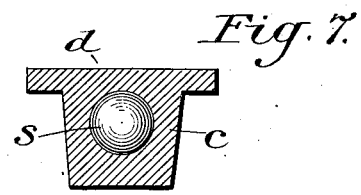
Witnesses:
Inventors

UNITED STATES PATENT OFFICE.

FRED H. DANIELS AND HORACE W. WYMAN, OF WORCESTER, MASSACHUSETTS.

MANUFACTURE OF RAIL-BONDS.

SPECIFICATION forming part of Letters Patent No. 709,878, dated September 30, 1902.

Application filed February 7, 1902. Serial No. 92,958. (No model.)

*To all whom it may concern:*

Be it known that we, FRED H. DANIELS and HORACE W. WYMAN, citizens of the United States, residing at Worcester, county of Worcester, State of Massachusetts, have invented certain new and useful Improvements in the Manufacture of Rail-Bonds; and we do hereby declare the following to be a full, clear, and exact description of the invention, such as will enable others skilled in the art to which it appertains to make and use the same.

The present invention relates to the manufacture of rail-bonds and similar electrical conductors, and has particularly in view to provide an improved method of making the rail-bond covered in our application for Letters Patent, filed January 13, 1902, Serial No. 89,499.

In the accompanying drawings, forming part of this specification, Figure 1 is a plan view of one of the terminals of a complete bond constructed in accordance with our invention, showing also a part of the conductor. Figs. 2 and 3 are respecitively end and side views of the terminal or head before the spreader and the conductor have been applied to it. Figs. 4 and 5 are sectional views of the same with the spreader in place, these two figures being the same except that each shows a different form of spreader. Fig. 6 shows in section the terminal and the press for forging or welding the conductor-terminals together; and Fig. 7 shows the completed device in section on the line 7 7, Fig. 1.

In the manufacture of this bond the head or terminal $a$ is formed to shape separately from the conductor $b$. The shape is important; but the particular manner of forming it is of no special consequence, as it may be cast or forged. It is formed with a cylindrical portion $c$, preferably tapered slightly, and a top $d$, which is flat and overhangs the cylindrical portion, as shown in all the figures. The head is formed with a deep cup-shaped recess or depression $e$, which is open at the top to receive a spreader $s$ of relatively harder metal, such as described and claimed in our application above referred to. The top is also formed with a shallow transverse slot $f$, which is preferably curved, as shown in Fig. 2, and extends across the open end of the recess. The formation of this head, having the recess and the slot as thus described, is the initial step in our improved method, which proceeds as follows: The object being to produce a bond like that described and claimed in our application already referred to, the next step is to locate in the bottom of the recess $e$ a spreader of harder metal than the head. This spreader may be of any suitable shape that will effect the result of causing the metal of the head to flow or move outwardly, as fully described in the aforesaid application. The two forms that up to the present have been found to be the simplest and most efficient are shown in Figs. 4 and 5—namely, a sphere or ball, as in the fourth figure, and a duplex conic arrangement, as in the fifth figure. This spreader should be fitted tightly into the bottom of the recess, as in the fourth and fifth figures, and it is unimportant whether the head be hot or cold at the time the spreader is fixed in place. When the spreader has thus been fitted into the recess, the conductor is secured to the head in the following manner.

The particular form of the conductor is not essential, but it should be made of the same soft metal as the head, and we prefer to form it of thin flat strands or ribbons, as indicated in Fig. 1. The strands are laid flatwise side by side and inserted edgewise into the slot $f$ over the top of the spreader, as shown in Fig. 6, and the terminal is then ready for the final and most important step in the process of manufacture, as follows:

It is essential to the efficient operation of the bond that the conductor should be united to the terminal in the manner best calculated to convert the two parts into one solid homogeneous piece without cracks, joints, or breaks of any kind. To this end we prefer to put the terminal in a die-press $h$, as shown in Fig. 6, and by means of a plunger, as $i$, we forge or weld the parts by enormous pressure into such intimate union that all actual or apparent joints between the bond and the terminal disappear and the whole becomes one solid integral head. It is unimportant whether this forging or welding of the conductors and terminal be done hot or cold; but we have obtained the best results by forging them together at the usual temperature in such operations. Another important result flowing from this method of forging or welding is that the spreader is completely incased in the recess by the same operation which unites the conductor to the terminal. In the preliminary formation of the terminal, as herein first described, the top of the head is made a little larger (wider or thicker) than it is intended to be in the completed bond, and the size and shape of the dies is such that this surplus metal is crowded toward the center and jammed down upon the top of the spreader, so as to completely envelop it on all sides and integrally embed it in the center of the terminal, thereby making it actually an integral part of the cylindrical portion $c$. In this forging operation the conductor-strands also contribute a part of their metal to filling up the top of the recess, and it will ordinarily be found most convenient to make them of a size large enough to provide for this. However, should this not be done a small piece of waste metal may be dropped into the recess on top of the spreader before the conductor-strands are fixed in the slot, or even such a piece might be placed on top of the strands just before the forging-die comes down, and thus any deficiency in the amount of metal in the head and conductor-strands may be compensated for.

The method of making our improved bond being as thus described it is to be noted that it provides for completely inclosing and concealing the spreader, as will be seen on reference to Fig. 7, by one and the same operation that unites the conductor to the head. The whole method is, moreover, extremely simple and economical and produces a superior article.

Having thus described our invention, what we claim is—

1. The herein-described method of making electrical conductors or bonds, consisting in forming the head with a cup-shaped central recess or depression and an open transverse slot or groove across the end over the recess, placing in said recess a ball or other expander of harder metal than the head, fitting the conducting-strands in the slot over the expander, and uniting said strands to the head and simultaneously closing the recess and causing the metal of the head to close around the expander by forging or welding.

2. The herein-described electrical conductor or bond, consisting of the head $a$, having a spreader or expander of harder metal inclosed in a central recess therein, and the conductor $b$ united to the head by being forged or welded into an open groove extending transversely across head.

In testimony whereof we affix our signatures in presence of two witnesses.

FRED H. DANIELS.
HORACE W. WYMAN.

Witnesses:
H. G. SUDDANE,
CHARLES M. BOOTH.